April 29, 1924.

J. T. JENSEN

BAND BRAKE

Filed Dec. 30, 1922

1,492,467

Patented Apr. 29, 1924.

1,492,467

UNITED STATES PATENT OFFICE.

JENS T. JENSEN, OF ST. PAUL, MINNESOTA.

BAND BRAKE.

Application filed December 30, 1922. Serial No. 609,930.

*To all whom it may concern:*

Be it known that I, JENS T. JENSEN, a citizen of the United States, and resident of St. Paul, in the county of Ramsey and State of Minnesota, have invented certain new and useful Improvements in Band Brakes; and I do hereby declare that the following is a full, clear, and exact description thereof.

The invention relates to brake bands for use on automobiles.

In the present construction of bands, there is great wear on account of the gripping action occurring near its ends rather than evenly throughout its circumference.

The invention comprises a band, a lining secured thereto, a plurality of plates interposed between the band and the lining, studs extending through openings in the band, and springs urging the plates inwardly.

The object of the invention is the provision of a construction which will eliminate chattering and give greater and more even wearing and better oiling of band linings at all points of their circumference. The contraction of the ends of the lining does not create a condition of uneven frictional action adjacent the ends of the lining, but the movability of the plates permits a relaxation of the tension of the lining at these points and causes close adjustment and gripping by the lining throughout its entire circumference. This stops shredding of the lining and thereby eliminates any chance of clogging the oil line by fibre from the band.

With the above and other objects in view, which will appear as the description proceeds, my invention resides in the novel construction, combination and arrangement of parts, substantially as hereinafter described and more particularly defined by the appended claims, it being understood that such changes in the precise embodiment of the herein disclosed invention may be made as come within the scope of the claims.

In the accompanying drawing, I have illustrated one complete example of the physical embodiment of the present invention constructed according to the best mode I have so far devised for the practical application of the principles thereof, and in which:—

Figure 1:
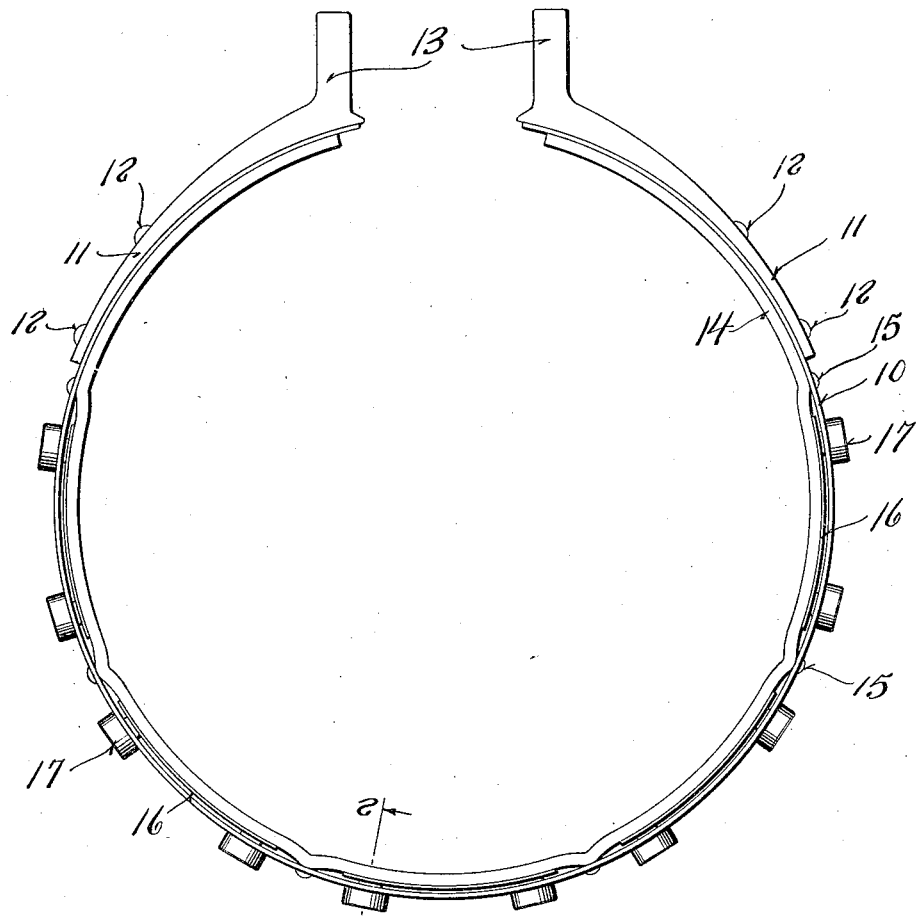
Figure 1 is a side elevation of an embodiment of the invention.
Figure 2:
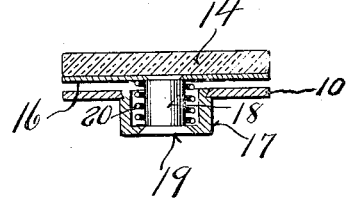
Figure 2 is a cross section on the line 2—2 of Figure 1.

The brake band 10 is secured at its end to shoes 11 by rivets 12 in the customary manner, the shoes terminating in jaws 13. Lining 14 extends about the circumference of the band, terminating adjacent jaws 13. Rivets 15 maintain the lining in position throughout the circumference. Between adjacent pairs of rivets flexible plates 16 are interposed, separating the lining from the band.

Adjacent the ends of the plates, openings are provided in the bands in which thimbles 17 are riveted, projecting in a radial direction. Studs 18 are riveted to the plates 16 and are provided with heads 19 adapted to fit within openings in the ends of thimbles 17. Spiral springs 20 envelope studs 18 and space plates 16 away from the band, one end of the springs contacting with the end of thimble 17. Thus springs 20 exert force tending to move lining 14 inwardly. When jaws 13 are contracted and braking action is exerted by the ends of the lining adjacent the jaws, the resilient manner of securement of plates 16 permits a facile sheathing of the band so that the frictional action developed is not localized to points immediately adjacent jaws 13, but is evenly distributed about the entire circumference. Nor is there any objectionable frictional action at any particular point on a plate 16. Not only is the portion of the plate, which is between studs 18, movable in a radial direction, but the ends of plate 16 are thus movable so that the tension of springs 20 maintains the plates in such position as to exert an effective braking action, but does not bring any particular portion of the plate to bear on the lining with excessive force.

Thus the wear on the lining throughout its entire circumference is equalized. The fact that no objectionable frictional action is developed at a particular point permits an oiling of the lining uniformly throughout the entire circumference of the lining. This prevents shredding of the lining and eliminates all possibility of clogging the oil line by fibre from the band. The uniform gripping of the lining throughout its entire circumference prevents the catching of any particular portion of the lining on a braking surface so that tendency to chatter is obviated.

Plates 16 may be rigid or semi-flexible and have the curvature of an arc of a circle.

I claim:—

1. The combination of a brake band, a lining therefor, a plurality of yieldable plates interposed between said band and said lining, resilient means retaining said plates on said band and urging said plates inwardly of said bands, each of said plates having the curvature of an arc of a circle.

2. The combination of a brake band, a lining therefor, a plurality of yieldable plates interposed between said band and said lining, each of said plates having the curvature of an arc of a circle, means securing said plates to said band, and springs for urging said plates inwardly.

3. The combination of a brake band, a lining, a plurality of plates interposed between said band and said lining, a pair of studs on each of said plates, means securing said studs to said band and permitting movement of said studs in a radial direction, and resilient means for urging said plates inwardly.

4. The combination of a band, a lining therefor, a plurality of plates interposed between said lining and said band, said lining having openings therein, studs on said plates projecting through said openings, thimbles secured to said band at said openings, springs enveloping said studs and urging said studs inwardly, and heads on said studs limiting the inward movement thereof.

In testimony that I claim the foregoing I have hereunto set my hand at St. Paul, in the county of Ramsey and State of Minnesota.

J. T. JENSEN.